United States Patent
Waller et al.

(10) Patent No.: US 12,008,421 B1
(45) Date of Patent: Jun. 11, 2024

(54) PRINT DATA CONVERSION MECHANISM

(71) Applicants: Marquis Waller, Boulder, CO (US);
Michael Lotz, Boulder, CO (US);
Jeffrey Sikkink, Boulder, CO (US);
Ryszard Ligas, Boulder, CO (US)

(72) Inventors: Marquis Waller, Boulder, CO (US);
Michael Lotz, Boulder, CO (US);
Jeffrey Sikkink, Boulder, CO (US);
Ryszard Ligas, Boulder, CO (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/179,892

(22) Filed: Mar. 7, 2023

(51) Int. Cl.
*G06K 15/02* (2006.01)

(52) U.S. Cl.
CPC ..... *G06K 15/1815* (2013.01); *G06K 15/1819* (2013.01)

(58) Field of Classification Search
None
See application file for complete search history.

(56) References Cited

U.S. PATENT DOCUMENTS 9,477,731 B2 10/2016 Kornacker et al.
10,120,904 B2 11/2018 Ranganathan
2013/0271777 A1 10/2013 Ito
2018/0075115 A1 3/2018 Allen et al.
2019/0370348 A1* 12/2019 Beyer ................. G06F 16/13

FOREIGN PATENT DOCUMENTS

JP 2004005728 A 1/2004
WO 2020085938 A1 4/2020

OTHER PUBLICATIONS

Praful Kava et al., "Build a Lake House Architecture on AWS", Amazon, 10 pages, no publication date.

* cited by examiner

*Primary Examiner* — Lennin R Rodriguezgonzalez
(74) *Attorney, Agent, or Firm* — Jaffery Watson Mendonsa & Hamilton LLP (57) ABSTRACT

A system includes at least one physical memory device and one or more processors coupled with the at least one physical memory device, the one or more processors to receive data from a plurality of printing entities, wherein the data received from each of the plurality of printing entities comprises a different data format, process the data associated with each of the pluralities of entities to convert the data to meta-data and combine the meta-data into a functional data format.

17 Claims, 6 Drawing Sheets

PRINT DATA CONVERSION MECHANISM

FIELD

This invention relates generally to the field of print services. More particularly, the invention relates to a print services workflow management.

BACKGROUND

Entities with substantial printing demands typically implement a high-speed production printer for volume printing (e.g., one hundred pages per minute or more). Production printers may include continuous-forms printers that print on a web of print media stored on a large roll. A production printer typically includes a localized print controller that controls the overall operation of the printing system, and a print engine that includes one or more printhead assemblies, where each assembly includes a printhead controller and a printhead (or array of printheads).

SUMMARY

In one embodiment, a system is disclosed. The system includes at least one physical memory device and one or more processors coupled with the at least one physical memory device, the one or more processors to receive data from a plurality of printing entities, wherein the data received from each of the plurality of printing entities comprises a different data format, process the data associated with each of the pluralities of entities to convert the data to meta-data and combine the meta-data into a functional data format.

BRIEF DESCRIPTION OF THE DRAWINGS

In the following drawings like reference numbers are used to refer to like elements. Although the following figures depict various examples, one or more implementations are not limited to the examples depicted in the figures.

DETAILED DESCRIPTION

Cloud-based Backup-as-a-Service (BaaS) entities may be implemented by printing entities (or print shops) to provide backup (e.g., for auditing purposes and/or disaster recovery) for jobs that are to be printed. In addition, these BaaS entities may implement business intelligence (BI) tools to illustrate trends that can be used to assist the print shops in making critical business choices based on past job processing. However, handling data from different print shops can be cumbersome and difficult. In many cases, for example, the data may be spread across several systems in various formats (e.g., comma-separated values (CSV), databases, job definition format (JDF), etc.), which is difficult to process in a manner that it can be used as a single set of data.

According to one embodiment, a mechanism to convert data having a plurality of formats into a common format is described. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Throughout this document, terms like "logic", "component", "module", "engine", "model", "unit" and the like, may be referenced interchangeably and include, by way of example, software, hardware, and/or any combination of software and hardware, such as firmware. Further, any use of a particular brand, word, term, phrase, name, and/or acronym, should not be read to limit embodiments to software or devices that carry that label in products or in literature external to this document.

It is contemplated that any number and type of components may be added to and/or removed to facilitate various embodiments including adding, removing, and/or enhancing certain features. For brevity, clarity, and ease of understanding, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

Figure 1:
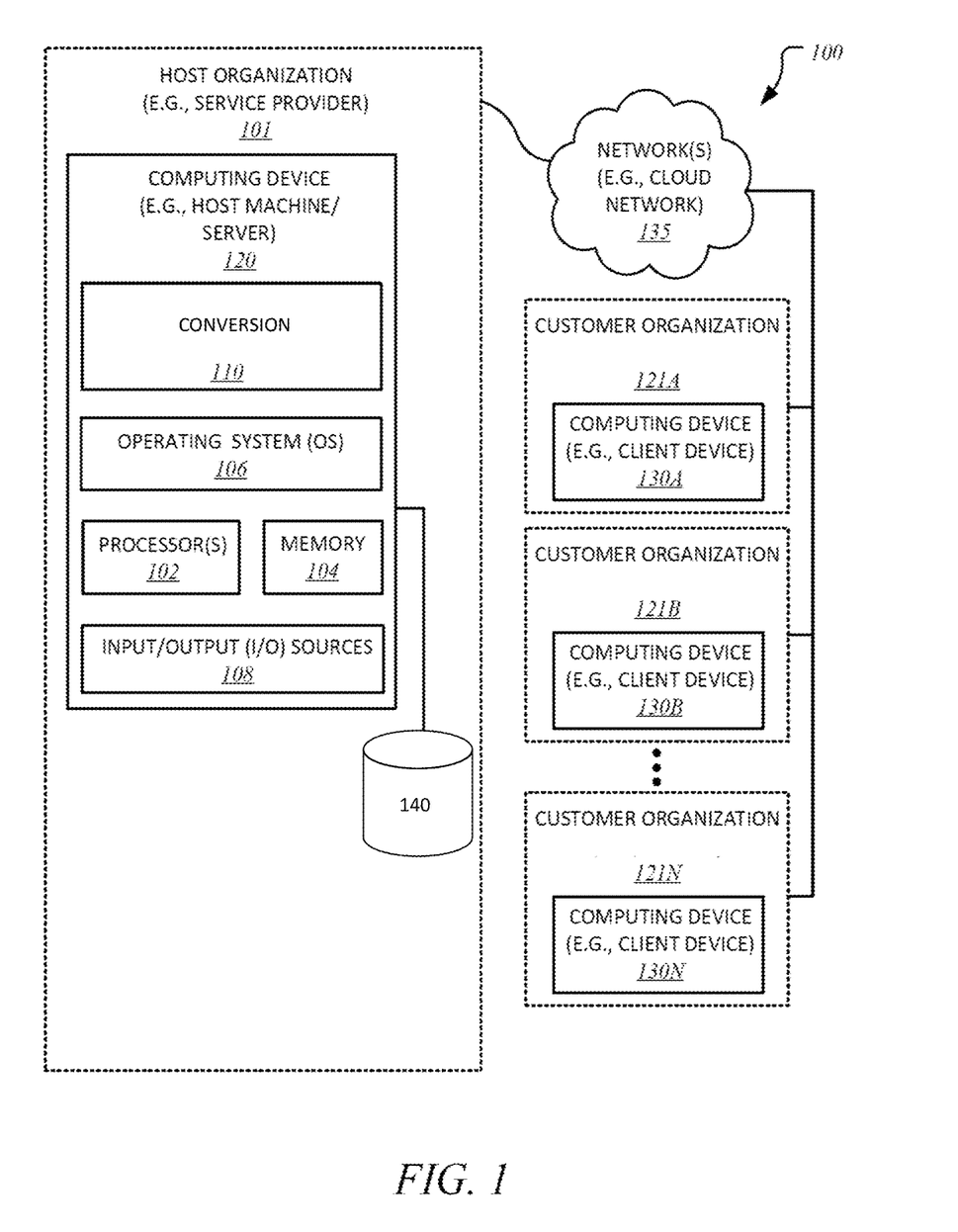
FIG. 1 illustrates a system having a computing device employing a print data conversion mechanism according to one embodiment.

FIG. 1 illustrates a system 100 having a computing device 120 employing a print data conversion mechanism 110 according to one embodiment. In one embodiment, computing device 120 includes a host server computer serving as a host machine for employing print data conversion (or conversion) mechanism 110 to facilitate the conversion and processing of data, including print data, received from a plurality of printing entities having various data formats into a functional data format. As used herein, print data is defined as data used by a printer to print data to a medium. In embodiments, print data may comprise components (or objects used to print text, images, graphics, bar codes, etc.) and resources (e.g., page segments, overlays, fonts, form definitions, and page definitions). In further embodiments, print data may be comprised of a data file (or print file) that may be transmitted between computer systems. Further, functional data comprises data that may be used in functional data analysis (FDA) to analyze, model and predict time series data.

Computing device 120 may include (without limitation) server computers (e.g., cloud server computers, etc.), desktop computers, cluster-based computers, set-top boxes (e.g., Internet-based cable television set-top boxes, etc.), etc. Computing device 120 includes an operating system ("OS") 106 serving as an interface between one or more hardware/physical resources of computing device 120 and one or more client devices 130A-130N, etc. Computing device 120 further includes processor(s) 102, memory 104, input/output ("I/O") sources 108, such as touchscreens, touch panels, touch pads, virtual or regular keyboards, virtual or regular mice, etc.

In one embodiment, host organization 101 may operate as a Backup-as-a-Service (BaaS) that is communicably interfaced with host organization 121 client devices 130A-N through host organization 101. As a result, host organization 101 provides secure data storage safe from unauthorized access, corruption, hacking, or theft. Client devices 130A-N may include (without limitation) customer organization-based server computers, desktop computers, laptop computers, mobile computing devices, such as smartphones, tablet computers, personal digital assistants, etc.

In one embodiment, the illustrated database(s) 140 store (without limitation) information and underlying database records having customer and user data therein on to process documents and/or print jobs on behalf of customer organizations 121A-N. In some embodiments, host organization 101 receives input and other requests from a plurality of customer organizations 121A-N over one or more networks 135; for example, incoming print job and/or document processing requests, or other inputs may be received from customer organizations 121A-N to be processed using database system 140.

In one embodiment, each customer organization 121A-N is an entity selected from a group consisting of a separate and distinct remote organization, an organizational group within host organization 101, a business partner of host organization 101, a customer organization 121A-N that subscribes to cloud computing services provided by host organization 101, etc. In a further embodiment, customer organizations 121A-N comprise printing entities that implement high-speed production printers for volume printing.

In one embodiment, requests are received at, or submitted to, a web server within host organization 101. Host organization 101 may receive a variety of requests for processing by host organization 101. For example, incoming requests received at the web server may specify backup services from host organization 101 are to be provided. Further, host organization 101 may implement a request interface via the web server or as a stand-alone interface to receive requests from the client devices 130A-N.

Figure 2:
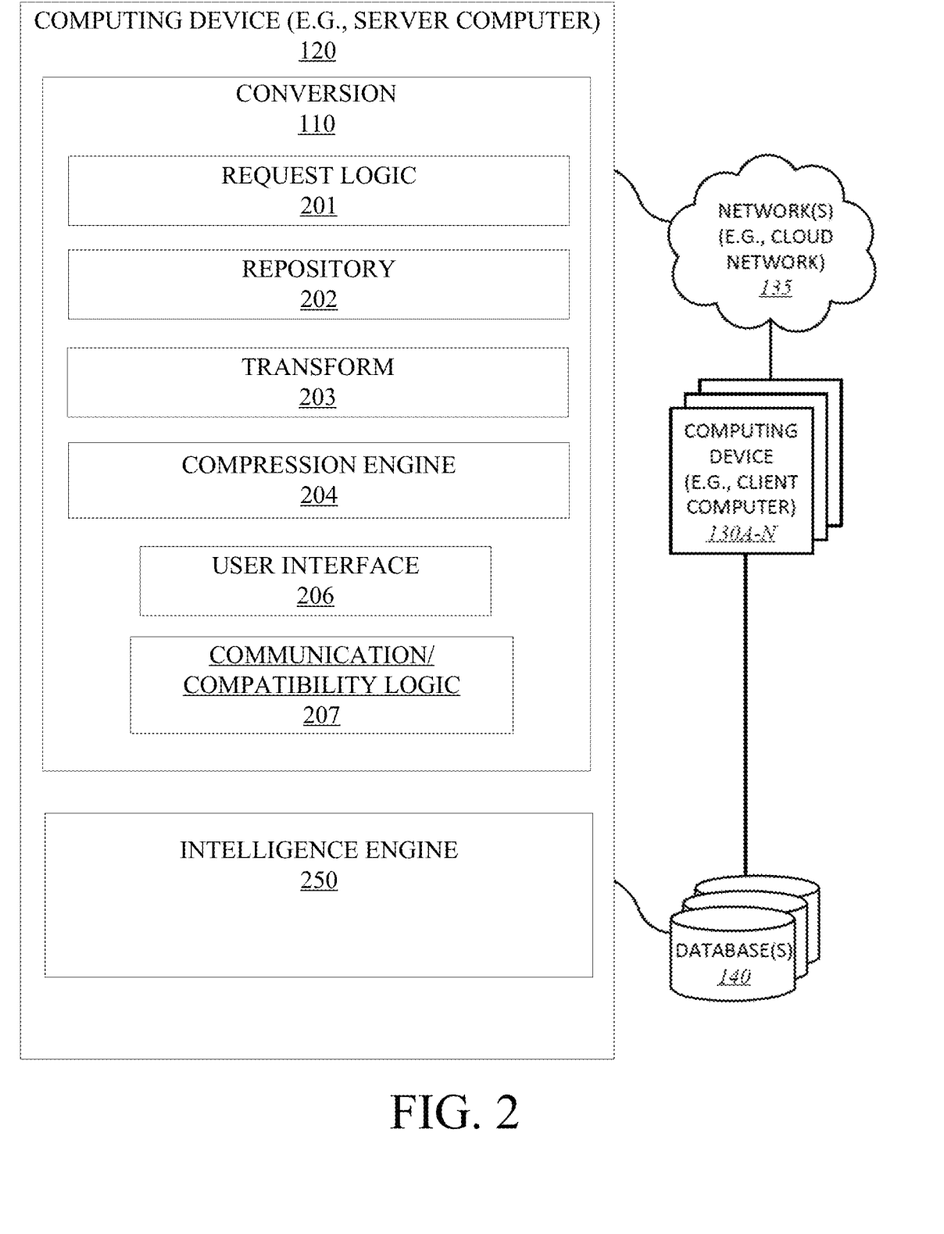
FIG. 2 illustrates a print data conversion mechanism according to one embodiment.

FIG. 2 illustrates conversion mechanism 110 of FIG. 1 according to one embodiment. Conversion mechanism 110 may include any number and type of components, such as request logic 201, repository 202, transform 203, compression engine 204, user interface 206 and communication/compatibility logic 207.

In one embodiment, computing device 120 may include a server computer which may be further in communication with one or more databases or storage repositories, such as database(s) 140, which may be located locally or remotely over one or more networks, such as network(s) 135 (e.g., cloud network, Internet, proximity network, intranet, Internet of Things ("IoT"), Cloud of Things ("CoT"), etc.). Computing device 120 is further shown to be in communication with any number and type of other computing devices, such as client computing devices 130A-N, over one or more networks, such as network(s) 135.

In one embodiment, computing device 120 may serve as a service provider core for hosting and maintaining conversion mechanism 110 as a BaaS, and be in communication with one or more client computers 130A-N, over one or more network(s) 135, and any number and type of dedicated nodes. As aforementioned, with respect to FIG. 1, any number and type of requests may be received at or submitted for processing. For example, incoming requests may specify services from computing device 120 are to be provided, such as backup and/or business intelligence requests, on behalf of one or more client devices 130A-N, code execution requests, and so forth.

According to one embodiment, host organization 101 may perform BaaS services for client devices 130. In such an embodiment, conversion mechanism 110 may be implemented to manage the storage, conversion and processing of print data. Host organization 101 may receive storage requests, some of which may include print data including a high volume (e.g., thousands) of print jobs.

In one embodiment, conversion mechanism 110 is implemented as a micro-services implementation in a cloud computing environment. Conversion mechanism 110 may implement request logic 201 to serve as a request interface via a web server or as a stand-alone interface, such as user interface 206, to receive requests from the client devices 130A-N. The request interface may further support the return of response packets or other replies and responses in an outgoing direction from computing device 120 to one or more client devices 130A-N. In a further embodiment, request logic 201 receives requests from a customer organization 121 to perform backup services of print data submitted to computing device 120 with a request.

Repository 202 is implemented to store print data received from client devices 130A-N. In one embodiment, repository 202 stores the print data in a format received from devices 130A-N. In such an embodiment, repository 202 receives and stores functional data, as well as print data having various formats without restructuring the data (e.g., in the original print data format). Thus, each device 130 may transmit data having a different format. For example, supported data formats comprise Advanced Function Presentation (AFP), portable document format (PDF), page description language (PDL), JavaScript Object Notation (JSON), comma-separated values (CSV), parquet, binary, etc.

In a further embodiment, repository 202 may automatically compress the data once received. In yet a further embodiment, the print data may be automatically backed up and stored in long term storage (e.g., database 140). In this embodiment, additional data may be retrieved from a file (e.g., AFP or PDF) and reprocessed at any time (e.g., years later).

Transform 203 processes the data to convert each of the various formats of data to a common functional data format. In one embodiment, transform 203 extracts data from each data format (e.g., print data, metadata used in print data, as well as from various types formats) and generates a metadata file associated with the data format. In such an embodiment, transform 203 combines the extracted meta-data files (e.g., from both print data and functional data sources) and inserts the data into a column-oriented data file format (e.g., parquet) that is designed for efficient data storage and retrieval by a business intelligence application that performs business analysis. In a further embodiment, transform 203 may begin the conversion process upon receiving a signal. In such an embodiment, the signal may be automatically generated based on predefined criteria indicating that the repository 202 data is to be processed. However in other embodiments, the signal may be generated via user interface 206.

Figure 3:
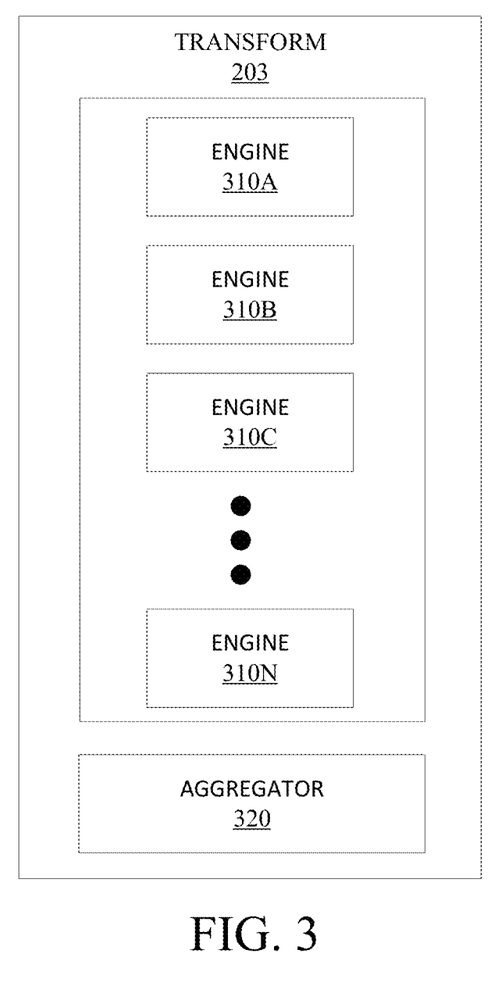
FIG. 3 illustrates one embodiment of a transform.

FIG. 3 illustrates one embodiment of a transform 203. As shown in FIG. 3, transform 203 discloses a plurality of transform engines 310 (e.g., engines 310A-310N) and an aggregator 320. In one embodiment, each engine 310 comprises a separate micro-service that performs an extract, transform, load (ETL) process based on a type of data format. For example, engine 310A is implemented to process AFP data, engine 310B is implemented to process PDF data, engine 310C is implemented to process XML data, etc. In a further embodiment, transform engines 310 process data in parallel. As used herein, an ETL is a process in which data is extracted, transformed (e.g., cleaned, sanitized, scrubbed) and loaded to an output data target. In one embodiment, each ETL process is performed as an Amazon Web Services (AWS) glue job. Micro-services comprise an architecture of services (e.g., web services) that are deployed independently and communicate via one or more protocols. For PDF and AFP data, a transform engine 310 reads print files, extracts text file data and placing the data into a table structured format (e.g., CSV). In one embodiment, the print files are processed using one or more configuration files having rules that specify attributes (e.g., positions, types, location boundaries, page boundaries, page grouping boundaries, etc.) and converted to a function data format.

In a further embodiment, transform engine 310 processes the data by establishing a scheme for the text values within the table structured format. In one embodiment, the scheme may be set based on a deduction from the input data. In another embodiment, the scheme may be set based on a hint (or type) specified in one or more configuration files. In yet another embodiment, the scheme may be set based on an algorithm that is configured to be applied against the data to arrive at the correct scheme. A similar process is performed at engines 310 associated with other data formats. However, the extraction of the CSV data may be performed in a different manner. For example, the JDF format comprises Extensible Markup Language (XML) that comprises a different extraction process.

Once processed by each engine 310, aggregator 320 subsequently combines the extracted meta-data files to aggregate the data into a single output functional file format supported by a data warehouse (e.g., database 140). Referring back to FIG. 2, compression engine 204 compresses the functional data generated by a transform engine 310 prior to storing the data in the data warehouse.

Intelligence engine 250 receives the functional data and performs data analysis and management of information associated with the customer organizations 121. For example, intelligence engine 250 may perform functions, such as reporting, online analytical processing, analytics, dashboard development, data mining, process mining, complex event processing, business performance management, benchmarking, text mining, predictive analytics, and prescriptive analytics.

Figure 4:
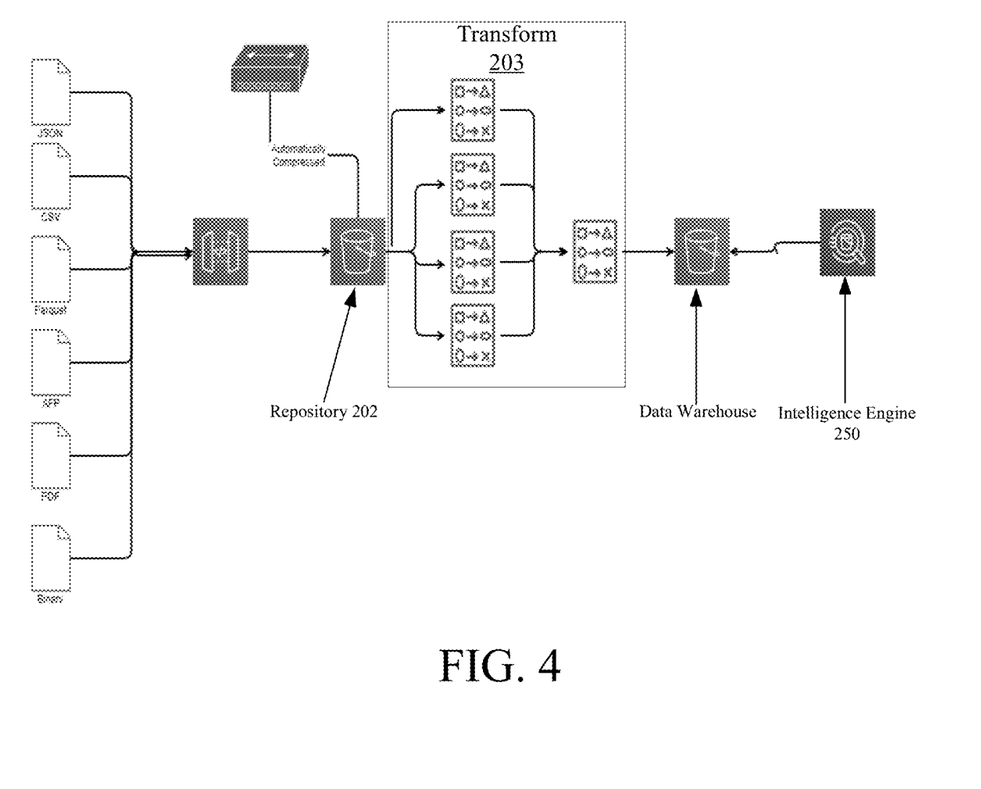
FIG. 4 illustrates another embodiment of a print data conversion mechanism.

According to one embodiment, intelligence engine 250 analyzes the data in database 140 for information in order to identify trends (or patterns) across multiple printing entities relating to performance of a printer, a group of printers, printer type, etc., based on the data received from customer organizations. For example, intelligence engine 250 may analyze various meta-data attributes (e.g., throughput, efficiency of time or materials, cost, number and/or types of errors, mailing information, such as cost to mail) included in the functional data. In one embodiment, intelligence engine 250 may transmit recommendations to one or more of the printing entities based on the analysis. In other embodiments, intelligence engine 250 may be implemented at a location remote from computing device 120. FIG. 4 illustrates another embodiment of conversion mechanism 110 and intelligence engine 250.

Communication/compatibility logic 207 may facilitate the ability to dynamically communicate and stay configured with any number and type of software/application developing tools, models, data processing servers, database platforms and architectures, programming languages and their corresponding platforms, etc., while ensuring compatibility with changing technologies, parameters, protocols, standards, etc.

Figure 5:
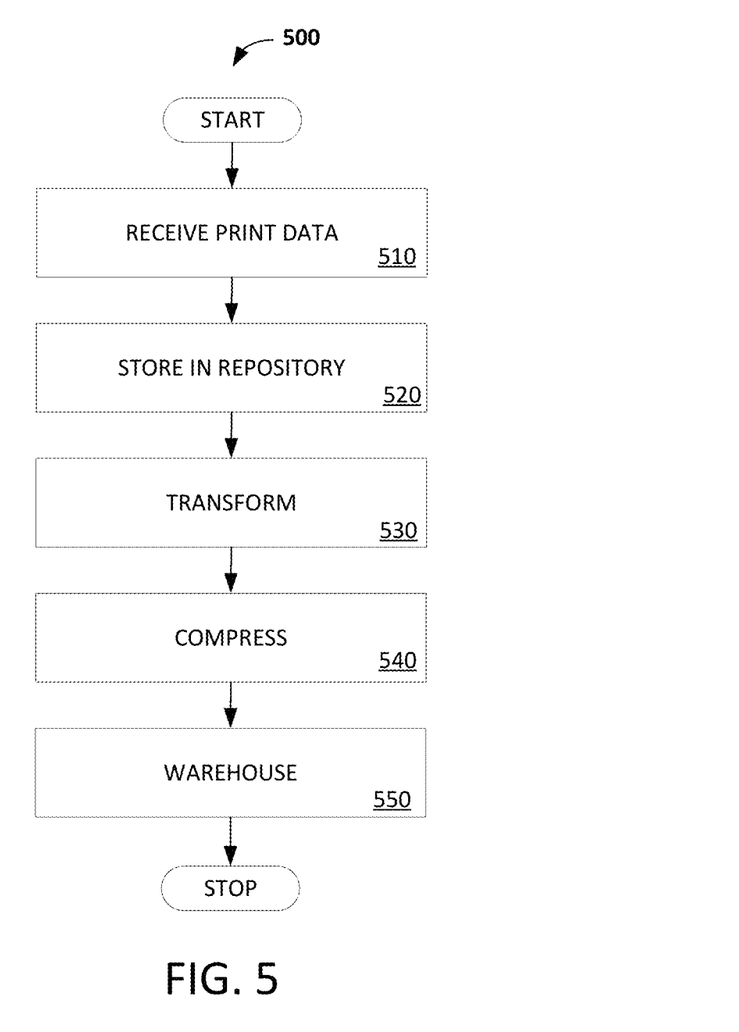
FIG. 5 is a flow diagram illustrating one embodiment of a process for performing workflow management.

FIG. 5 is a flow diagram illustrating one embodiment of a conversion process 500. Process 500 may be performed by processing logic that may comprise hardware (e.g., circuitry, dedicated logic, programmable logic, etc.), software (such as instructions run on a processing device), or a combination thereof. In one embodiment, process 500 may be performed by workflow management mechanism 110. The process 500 is illustrated in linear sequences for brevity and clarity in presentation; however, it is contemplated that any number of them can be performed in parallel, asynchronously, or in different orders. For brevity, clarity, and ease of understanding, many of the details discussed with reference to FIGS. 1-4 are not discussed or repeated here.

Process 500 begins at processing block 510, where print data from a plurality of print shops is received. As discussed above, the print data received from each print shop may include different formats. At processing block 520, the data is stored in repository 220 in the original formats. At processing block 530, the data is transformed. As mentioned above, the data transform comprises extracting text data from each of a plurality of formats, placing the data into a table structured format, establishing a scheme for the text values within the table structured format and converting the data to a column-oriented data file format (or meta-data file). Subsequently, the meta-data files are aggregated. At processing block 540, the functional data is compressed. At decision block 550, the compressed data is stored in a data warehouse. Subsequently, the functional data may be retrieved from the data warehouse by intelligence engine 250 to perform business intelligence.

Figure 6:
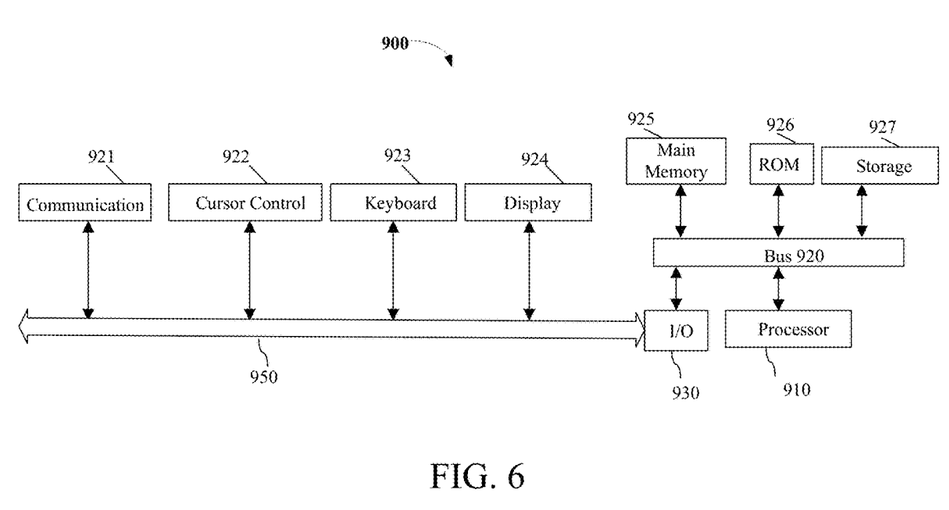
FIG. 6 illustrates a computing device suitable for implementing embodiments of the present disclosure.

FIG. 6 illustrates a computer system 900 on which computing device 120 and/or 121 may be implemented. Computer system 900 includes a system bus 920 for communicating information, and a processor 910 coupled to bus 920 for processing information.

Computer system 900 further comprises a random-access memory (RAM) or other dynamic storage device 925 (referred to herein as main memory), coupled to bus 920 for storing information and instructions to be executed by processor 910. Main memory 925 also may be used for storing temporary variables or other intermediate information during execution of instructions by processor 910. Computer system 900 also may include a read only memory (ROM) and or other static storage device 926 coupled to bus 920 for storing static information and instructions used by processor 910.

A data storage device 927 such as a magnetic disk or optical disc and its corresponding drive may also be coupled to computer system 900 for storing information and instructions. Computer system 900 can also be coupled to a second I/O bus 950 via an I/O interface 930. A plurality of I/O devices may be coupled to I/O bus 950, including a display device 924, an input device (e.g., a keyboard (or alphanumeric input device) 923 and or a cursor control device 922). The communication device 921 is for accessing other computers (servers or clients). The communication device 921 may comprise a modem, a network interface card, or other well-known interface device, such as those used for coupling to Ethernet, token ring, or other types of networks.

Embodiments may be implemented as any or a combination of: one or more microchips or integrated circuits interconnected using a parent board, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions in any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. A non-transitory computer-readable medium having stored thereon instructions that, when executed by one or more processors, cause the one or more processors to:
   receive first data from a first of a plurality of printing entities, wherein the first data comprises a first data format;
   receive second data from a second of the plurality of printing entities, wherein the second data comprises a second data format;
   process the first data at a first micro-service to generate first metadata;
   process the second data at a second micro-service to generate second metadata; and
   combine extracted first and second metadata into a functional data format.

2. The computer-readable medium of claim 1, wherein processing the first and second data comprises:
   extracting text data from the data;
   placing the data into a table structured format;
   establishing a scheme for the text data within the table structured format; and
   converting the data into a meta-data file.

3. The computer-readable medium of claim 2, having stored thereon instructions that, when executed by one or more processors, further cause the one or more processors to store the data in a repository prior to processing the data.

4. The computer-readable medium of claim 3, wherein the data is stored in the repository prior in an original data format.

5. The computer-readable medium of claim 4, having stored thereon instructions that, when executed by one or more processors, further cause the one or more processors to store the functional data in a data warehouse.

6. The computer-readable medium of claim 5, having stored thereon instructions that, when executed by one or more processors, further cause the one or more processors to analyze meta-data in the functional data to determine trends of the plurality of printing entities.

7. The computer-readable medium of claim 6, having stored thereon instructions that, when executed by one or more processors, further cause the one or more processors to generate one or more recommendations based on an analysis.

8. The computer-readable medium of claim 7, having stored thereon instructions that, when executed by one or more processors, further cause the one or more processors to transmit the one or more recommendations to one or more of the plurality of printing entities.

9. The computer-readable medium of claim 1, wherein the first data and the second data are processed in parallel.

10. A system comprising:
    at least one physical memory device; and
    one or more processors coupled with the at least one physical memory device, the one or more processors to:
       receive first data from a first of a plurality of printing entities, wherein the first data comprises a first data format;
       receive second data from a second of the plurality of printing entities, wherein the second data comprises a second data format;
       process the first data at a first micro-service to generate first metadata;
       process the second data at a second micro-service to generate second metadata; and
       combine extracted first and second metadata into a functional data format.

11. The system of claim 10, wherein processing the first and second data comprises:
    extracting text data from the data;
    placing the data into a table structured format;
    establishing a scheme for the text data within the table structured format; and
    converting the data into the a meta-data file.

12. The system of claim 11, wherein the one or more processors store the data in a repository prior to processing the data.

13. The system of claim 10, wherein the first data and the second data are processed in parallel.

14. A method comprising
    receiving first data from a first of a plurality of printing entities, wherein the first data comprises a first data format;
    receiving second data from a second of the plurality of printing entities, wherein the second data comprises a second data format;

processing the first data at a first micro-service to generate first metadata;

processing the second data at a second micro-service to generate second metadata; and combining extracted first and second metadata into a functional data format.

15. The method of claim 14, wherein processing the first and second data comprises:

extracting text data from the data;

placing the data into a table structured format;

establishing a scheme for the text data within the table structured format; and converting the data into a meta-data file.

16. The method of claim 15, further comprising analyzing meta-data in the functional data to determine trends of the plurality of printing entities.

17. The method of claim 14, wherein the first data and the second data are processed in parallel.

* * * * *